(12) United States Patent
Maat et al.

(10) Patent No.: US 10,840,032 B1
(45) Date of Patent: Nov. 17, 2020

(54) SUPERCAPACITOR CELL WITH HIGH-PURITY BINDER-FREE CARBONACEOUS ELECTRODE

(71) Applicant: YAZAKI CORPORATION, Tokyo (JP)

(72) Inventors: Stefan Maat, Camarillo, CA (US); Satyabrata Raychaudhuri, Camarillo, CA (US); Sean Imtiaz Brahim, Camarillo, CA (US); Sanliang Zhang, Thousand Oaks, CA (US)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/984,076

(22) Filed: Aug. 3, 2020

Related U.S. Application Data

(60) Provisional application No. 62/994,217, filed on Mar. 24, 2020.

(51) Int. Cl.
*H01G 11/36* (2013.01)
*H01G 11/28* (2013.01)
*H01G 11/52* (2013.01)
*H01G 11/68* (2013.01)
*H01G 11/24* (2013.01)

(52) U.S. Cl.
CPC ............ *H01G 11/36* (2013.01); *H01G 11/24* (2013.01); *H01G 11/28* (2013.01); *H01G 11/52* (2013.01); *H01G 11/68* (2013.01)

(58) Field of Classification Search
CPC ........ H01G 11/36; H01G 11/24; H01G 11/28; H01G 11/52; H01G 11/68
See application file for complete search history.

(56) References Cited

U.S. PATENT DOCUMENTS

| | | | |
|---|---|---|---|
| 8,277,691 | B2 | 10/2012 | Lu |
| 8,318,308 | B2 | 11/2012 | Hata et al. |
| 8,760,851 | B2 | 6/2014 | Signorelli et al. |
| 8,911,859 | B1 | 12/2014 | Spatcher |
| 10,600,582 | B1 | 3/2020 | Brambilla et al. |

(Continued)

FOREIGN PATENT DOCUMENTS

| | | |
|---|---|---|
| EP | 1672652 A1 | 6/2006 |
| WO | 2019188556 A1 | 10/2019 |

OTHER PUBLICATIONS

Huang, Naibao, et al., "Effect of carbon nanotube loadings on supercapacitor characteristics", Int. J. Energy Res. 2015; 39:336-343.

(Continued)

*Primary Examiner* — Dion Ferguson
(74) *Attorney, Agent, or Firm* — Perkins Coie LLP; Viola T. Kung

(57) ABSTRACT

The present invention is directed to a supercapacitor cell having at least one electrode comprising a current collector and an active layer, wherein the active layer comprises activated carbon and high purity carbon nanotubes and is free of binder. The active layer materials are both porous and conductive in order to increase the charge storage capability and to decrease the electrode resistance. In general, the content of carbon nanotubes in the active layer is between 10 and 30 wt. % and the purity of the carbon nanotubes is at least 95 wt. %.

33 Claims, 10 Drawing Sheets

(56) References Cited

U.S. PATENT DOCUMENTS

| | | | | |
|---|---|---|---|---|
| 2011/0304964 A1* | 12/2011 | Fleischer | ............... | H01G 11/40 361/679.01 |
| 2012/0313591 A1* | 12/2012 | Brambilla | ............. | C01B 32/162 320/166 |
| 2015/0228982 A1* | 8/2015 | Shibano | ................. | H01G 11/36 429/245 |
| 2015/0279577 A1* | 10/2015 | Uchida | ................. | H01G 11/62 429/336 |
| 2019/0312281 A1* | 10/2019 | Shibano | ................. | H01G 11/70 |
| 2019/0312282 A1* | 10/2019 | Shibano | ................... | C09D 5/00 |
| 2019/0371534 A1* | 12/2019 | Brambilla | ............. | H01G 11/28 |
| 2020/0083516 A1 | 3/2020 | Hatanaka et al. | | |
| 2020/0255419 A1* | 8/2020 | Zhamu | ................... | H01G 11/36 |

OTHER PUBLICATIONS

Lei, Chunhong, et al., "Activated carbon-carbon nanotube nanocomposite coatings for supercapacitor applications", Surface & Coatings Technology 232 (2013) 326-330.

Liu, Tao, et al., "SWNT/PAN composite film-based supercapacitors", Carbon 41 (2003) 2427-2451.

Obreja, Vasile V.N., "On the performance of supercapacitors with electrodes based on carbon nanotubes and carbon activated material—A review", Physica E 40 (2008) 2596-2605.

Portet, C., et al., "Influence of carbon nanotubes addition on carbon-carbon supercapacitor performances in organic electrolyte", Journal of Power Sources 139 (2005) 371-378.

Show, Yoshiyuki, "Electric Double-Layer Capacitor Fabricated with Addition of Carbon Nanotube to Polarizable Electrode", Journal of Nanomaterials 2012, 929343.

Taberna, Pierre-Louis, et al., "Activated carbon-carbon nanotube composite porous film for supercapacitor applications", Materials Research Bulletin 41 (2006) 478-484.

Xu, Guanghui, et al., "Binder-Free Activated Carbon/Carbon Nanotube Paper Electrodes for Use in Supercapacitors", Nano Research 4 (2011) 870-881.

\* cited by examiner

US 10,840,032 B1

SUPERCAPACITOR CELL WITH HIGH-PURITY BINDER-FREE CARBONACEOUS ELECTRODE

The present application claims priority to U.S. Provisional Application No. 62/994,217, filed Mar. 24, 2020, the content of which is incorporated herein by reference in its entirety.

FIELD OF THE INVENTION

The present invention relates to a supercapacitor cell in which at least one electrode comprises a current collector and an active layer, wherein the active layer comprises activated carbon and high purity carbon nanotubes, and is free of any binder.

BACKGROUND

Supercapacitors are electrochemical storage devices able to fill the gap existing between batteries and dielectric capacitors from the energy and power density point of view. As compared to batteries, supercapacitors can deliver higher power, but store less energy; as compared to capacitors, they store more energy but deliver less power.

The ability of an electrode to hold charge is related to the porosity of its active layer as high porosity leads to high surface area. The ability of a supercapacitor to store charge is measured by its capacitance. The energy density of a supercapacitor is proportional to the capacitance and the square of the charge voltage. The power density of a supercapacitor is inversely proportional to its internal resistance also called its equivalent series resistance and proportional to the square of the charge voltage.

Activated carbon, due to its high surface area of typically >1,000 $m^2/g$, is the most common material currently used for charge storage in capacitor electrodes. Activated carbon however is a poor electrical conductor and cannot be coated on current collector foils without a binder. Binders are typically polymeric and insulating such as polyvinylidene fluoride (PVDF). To increase the conductivity, conductive graphitic materials such as carbon black are added to the electrode. The mixture of activated carbon, carbon-black, and binder is dispersed in an organic solvent and coated on a current collector foil, typically aluminum or copper. The organic solvent is then removed by drying.

The conducting carbon-black particles do not exhibit a significant porosity and therefore do not significantly contribute to the storage of charge. Both the carbon-black particles and binder thus equate to a dead volume in terms of volumetric charge capacity. Hence, the energy density of a conventional supercapacitor is reduced by the inclusion of binder and carbon-black.

The non-conducting binder increases the resistivity of the active layer of the electrodes. Hence, the power density of a conventional supercapacitor is reduced through the inclusion of binder. Also, because the binder decomposes at high temperatures, its presence in the supercapacitor electrode limits the supercapacitor cell from being reflow soldered for direct surface mounting onto printed circuit boards and electrical platforms.

DETAILED DESCRIPTION OF THE INVENTION

Figure 1:
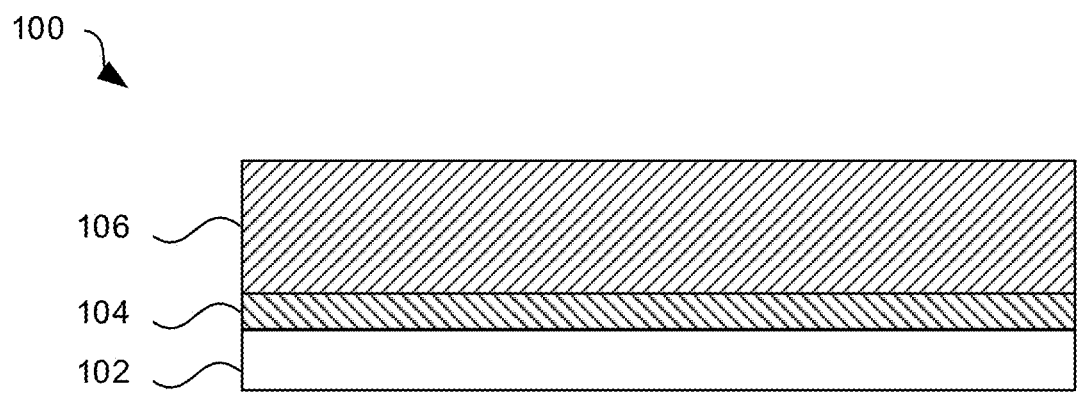
FIG. 1 is a schematic of an electrode.

The inventors have developed a supercapacitor electrode with an active layer comprising a composite of activated carbon (AC) and high purity carbon nanotubes (CNT) and free of binder.

References herein to "binder" are intended to convey the meaning of polymers, co-polymers, and similar ultra-high molecular weight substances typically used to provide a binding for carbon in the active layer of a supercapacitor electrode. Such substances are often employed as binder for promoting cohesion among loosely-assembled particulate materials, i.e., active filler materials that perform some useful function in a particular application. Examples of such binders include polyvinylidene fluoride (PVDF), styrene-butadiene rubber (SBR), sodium-carboxymethyl cellulose (CMC), and polytetrafluoroethylene (PTFE).

The present supercapacitor electrode does not include binder in the active layer as it does not contribute to the charge storage capacity, and hence it is advantageous to replace it with a material (e.g., carbon nanotubes) that can serve both to store charge and maintain the integrity of the electrode. Furthermore, the absence of binder enables cells containing the present supercapacitor electrode to be reflow soldered for direct surface mounting onto printed circuit boards and electrical platforms.

The first aspect of the present invention is directed to a supercapacitor cell having at least one electrode comprising a current collector and an active layer, wherein the active layer comprises activated carbon, and carbon nanotubes having purity of at least 95 wt. %, and is free of any binder. In general, a supercapacitor cell comprises two electrodes separated by an electrically conducting solution comprising an electrolyte.

Carbon nanotubes are high-aspect ratio carbonaceous materials with significant surface area and low mass density. The CNTs used in the present invention preferably are single wall carbon nanotubes (SWCNTs), but can also include double wall carbon nanotubes (DWCNTs) and multi wall carbon nanotubes (MWCNTs). Depending on its chirality, a single wall CNT (SWCNT) is either metallic (armchair) or semiconducting (zig-zag or chiral). The SWCNTs in the present invention can be metallic SWCNTs or semiconducting SWCNTs or preferably a mixture of metallic and semiconducting SWCNTs. Moreover, the CNTs are purified to the extent that their content of detectable metallic and other impurities is less than 5 wt. % and their Raman G/D integrated peak area ratio is at least 20 measured at a wavelength of 532 nm. In aggregate, this mixture of high purity metallic and semiconducting CNTs has a relatively high electrical conductivity.

The AC is located within a network formed by the CNT. The binder-free active layer comprising AC and CNT exhibits advantageous properties over electrode active layers comprising activated carbon, carbon-black, and binder. The inventors further developed a process to prepare an aqueous dispersion of AC-CNT by high shear process without the use of surfactants.

The present electrode comprises an active AC-CNT layer which is free of binder. The preferred AC content in the active layer is 70 wt. % to 90 wt. %, more preferably 75 wt. % to 85 wt. %, and most preferably about 80% by weight. The preferred CNT content in the active layer is 10-30 wt. %, and more preferably 15-25% by weight, and most preferably 20% by weight.

In one embodiment, the present supercapacitor electrode reduces or eliminates the amounts of non-porous conducting carbon-black particles in the active layer (the electrode) of a supercapacitor in order to achieve high energy and power density. The active electrode material comprises only materials that are porous and/or conducting in order to increase the charge storage capability as measured in volumetric capacitance and to decrease the electrode resistance which is a major contributor to the equivalent series resistance of a cell. For example, the active electrode material (the active layer) comprises less than 1 wt. % of carbon black or does not comprise any amount of carbon black, which does not exhibit a significant porosity and does not contribute significantly to the storage of charge.

In another embodiment, depending on specific target supercapacitor requirements such as very low cell internal resistance, it may be desirable to include the conducting carbon black component in the electrode formulation at a minimum but sufficient quantity such as between 1 wt. % to 6 wt. % of the electrode.

In some embodiments, the electrode comprises an active AC-CNT layer with a thickness of 30 μm to 200 μm, more preferably 70 μm to 130 μm, and most preferably 90 μm to 110 μm. Reducing the thickness of the AC-CNT layer to less than 30 μm unacceptably limits the total available capacitance of the assembled cell, while increasing the AC-CNT layer thickness beyond 200 μm significantly limits the necessary facile diffusion of electrolyte ions into and out of the layer during charge and discharge operating cycles.

In some embodiments, the electrode comprises an electrically conductive underlayer, which is located between the current collector and the AC-CNT active layer in order to lower the interface resistance between AC-CNT and current collector. In some embodiments, the conductive underlayer is a carbon layer with $sp^2$ hybridized carbon content of at least 20%, preferably at least 40%, or at least 50%, or at least 60%, or at least 70% and has a preferred thickness of 0.01 μm to 10 μm, more preferably 0.1 μm to 5 μm, and most preferably 0.5 μm to 3 m. In some embodiments, the conductive underlayer comprises $sp^2$ carbon in the form of graphene, graphite, amorphous carbon, carbon black, fullerene, or any combination thereof, and does not comprise $sp^2$ carbon in the form of carbon nanotubes (CNT).

In some embodiments, a stable, surfactant-free, aqueous AC-CNT dispersion is prepared by a high shear process.

FIG. 1 illustrates an electrode 100 for use in the supercapacitor of the present invention. The electrode includes a current collector 102, an underlayer 104, and an active layer 106. The active layer 106 acts as energy storage media, for example, by providing a surface interface with an electrolyte for formation of an electric double layer. The underlayer 104 is optional and it may be omitted when the active layer 106 exhibits good adhesion and good electrical contact to the electrically conductive layer 102.

In some embodiments, the active layer 106 may be in the range of 30 μm to 200 m thick. The underlayer 104 may have a thickness in the range of 0.01 μm to 10 μm.

Figure 2:
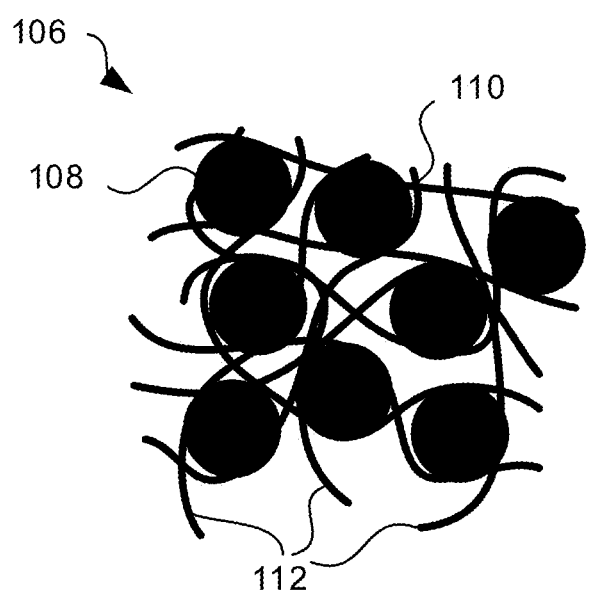
FIG. 2 is an illustration of a detailed view of an active layer of an electrode.

FIG. 2 illustrates the active layer 106 comprising activated carbon 108 bound together by a matrix 110 of carbon-nanotubes (CNTs) 112 (e.g., a webbing or network formed of CNTs).

In some embodiments, e.g., where the length of the CNTs is longer than the thickness of the active layer 106, the CNTs 112 forming the matrix 110 may lie primarily parallel to a major surface of the active layer 106. Note that although the CNTs 112 may form straight segments, in some embodiments, e.g., where longer CNTs are used, some or all of the CNTs may instead have a curved or serpentine shape. For example, CNTs 112 may curve and wind between the lumps of activated carbon 108.

In some embodiments, the length of the CNTs 112 forming the matrix 110 may be in the range of 1 μm to 5,000 μm, or any subrange thereof, such as 5 μm to 3000 μm, or 5 μm to 1000 m, or 10 μm to 1000 μm.

In some embodiments, the CNTs 112 forming the matrix 110 have a purity of at least 95 wt. %, preferably at least 97 wt. %, and more preferably at least 98 wt. %, and a Raman G/D integrated peak area ratio of at least 20, preferably at least 25, and more preferably at least 30, measured using a laser having a wavelength of 532 nm.

The active layer of the present invention is free of binder, such as polymer materials, adhesives, or the like.

The matrix 110 is free of any binder, but holds the activated carbon 108 together and maintains the structural integrity of the active layer 106 without flaking, delamination, disintegration, or the like.

The matrix 110 of carbon nanotubes provides a structural framework for the active layer 106, with the activated carbon 108 filling the spaces between the CNTs 112 of the matrix 110. In some embodiments, electrostatic forces (e.g., Van Der Waals forces) between the CNTs 112 within the matrix 110 and the other carbonaceous material 108 may provide substantially all of the binding forces maintaining the structural integrity of the layer.

The second aspect of the present invention is directed to a stable aqueous dispersion of carbon, wherein the carbon comprises 70-90 wt. % activated carbon, and 10-30 wt. % CNT having a purity of at least 95 wt. %; wherein the dispersion is free of surfactant; and is stable for at least 2 weeks, at least 1 month, at least 3 months, at least 6 months, at least 1 year, or at least 2 years.

An aqueous dispersion refers to a water solvent containing less than 10%, or less than 5%, or less than 1%, or less than 0.1% of organic solvent by weight, or a water solvent that does not contain any organic solvent.

A stable dispersion is one in which no visible powder, particles, flakes, or loose agglomerates precipitate out of the solvent or settle to the bottom of the mixture when no mechanical agitation is applied. In a stable dispersion, the carbon is not separated from the solvent, and the carbon is not sedimented to the bottom of a container.

In some embodiments, an aqueous suspension of AC and CNT in water is formed by adding a mixture of AC and CNT powder in a desired ratio in the range of (AC:CNT) 70:30 wt. % to 90:10 wt. %, more preferably 75:25 wt. % to 85:15 wt. %, or most preferably 80:20 wt. % into a vessel with water while introducing mechanical energy into the mixture of AC, CNT, and water, without the presence of a surfactant. The preferred concentration of carbonaceous material (AC and CNT) in water is 20 to 40 g/liter, more preferably 25 to 35 g/liter, and most preferably 30 g/liter.

In some embodiments, mechanical energy is added by stirring the mixture of AC, CNT, and water with an impeller and/or by bath-sonication after which a suspension of AC and CNT in water, i.e. an aqueous suspension of AC and CNT, is formed.

In some embodiments, the suspension of AC and CNT in water is exposed to a subsequent high shear process in order to significantly debundle the entangled strands of CNT after which a stable aqueous dispersion of carbon is formed.

In some embodiments, the surface area of the AC as measured by the Brunauer-Emmett-Teller (BET) method is greater than 1,000 $m^2/g$, preferably greater than 1,200 $m^2/g$, and more preferably greater than 1,500 m/g, and the BET surface area of the CNT is greater than 400 $m^2/g$, preferably greater than 600 $m^2/g$, and more preferably greater than 800 m/g.

In some embodiments, the chemical purity of the AC is greater than 95 wt. %, preferably greater than 96 wt. %, and more preferably greater than 98 wt. %. The D50 particle size of AC, i.e. the median particle size where 50% of the particles are larger and 50% are smaller than the given size, is in the preferred range of 1 to 20 μm, more preferably 3 to 15 μm, and most preferably 5 to 7 μm.

In some embodiments, the chemical purity of the CNT is at least 95 wt. %, preferably at least 97 wt. %, and more preferably at least 98 wt. %, and the CNT has a Raman G/D integrated peak area ratio of at least 20, preferably at least 25, and more preferably at least 30, measured using a laser having a wavelength of 532 nm. Typical impurities are iron (Fe) from the catalysis of CNT synthesis, and chlorine (Cl) from the CNT purification process. For example, a typical level of Fe impurity is about 1 wt. %, a typical level of Cl impurity is 0.5 wt. %, with the remainder of impurities from other elements such as but not limited to Nickel (Ni) and Sulphur (S).

Moreover, the amount of hydroxyl groups on the surface of the CNT should be minimized, i.e. the CNT should be free of hydroxyl groups (as can be assessed by Fourier-transform infrared (FTIR) Spectroscopy) as the hydroxyl groups may react in particular with polar solvents like acetonitrile (ACN).

The inventors have discovered that with increased purity of the CNT to at least 95 wt. %, the lifetime of the supercapacitor cell is extended, as determined by the increase in cell resistance or drop in cell capacitance during a 1,000-hour float test at a nominal cell voltage and temperature. The industry standard for a cell to pass such a test is to demonstrate less than a 100% increase in cell resistance, along with less than a 30% drop in cell capacitance, after 1,000 hours of floating. For example, a supercapacitor cell having at least 98 wt. % purified CNT free of hydroxyl groups in an AC-CNT active layer of the electrode and an acetonitrile electrolyte passes lifetime testing at 2.5 V and 70° C. The same cell except with a propylene carbonate electrolyte passes lifetime testing at 2.7 V and 70° C., and the same cell except with a polypropylene-carbonate/dimethyl-carbonate electrolyte passes lifetime testing at 3.0 V and 70° C. Commercially available CNTs often have purity less than 85 wt. %; when they are used in an electrode of a supercapacitor, cell capacitance decreases and cell failures increase, in comparison with the electrode of the present invention used in a supercapacitor.

The inventors have found an unexpected result that an active layer comprising AC and CNT in the desired ratio in the range of 70:30 wt. % to 90:10 wt. %, preferably 75:25 wt. % to 85:15 wt. %, and more preferably 80:20 wt. %, provides for superior cell performance (e.g. low resistance, high voltage performance, and high energy and power density) as compared to cells with electrodes comprising AC with carbon black and a binder.

In some embodiments, the matrix 110 of CNTs 112 form an interconnected network of highly electrically conductive paths for current flow through the active layer 106. For example, in some embodiments, highly conductive junctions may occur at points where CNTs 112 of the matrix 110 intersect with each other, or where they are in close enough proximity to allow for quantum tunneling of charge carriers from one CNT to the next. While the CNTs 112 may make up a relatively low mass fraction of the active layer (e.g., less than 25 wt %, 20 wt %, or 15 wt %), the interconnected network of highly electrically conductive paths formed in the matrix 110 may provide long conductive paths to facilitate current flow within and through the active layer 106 (e.g. conductive paths on the order of the thickness of the active layer 106).

As used herein, the term "highly conductive pathway" is to be understood as a pathway formed by interconnected CNTs 112 having an electrical conductivity higher than the electrical conductivity of the activated carbon material 108.

Not being bound by theory, in some embodiments the matrix 110 can be characterized as an electrically interconnected network of CNTs exhibiting connectivity above a percolation threshold. Percolation threshold is a mathematical concept related to percolation theory, which is the formation of long-range connectivity in random systems. Below the threshold a so-called "giant" connected component of the order of system size does not exist; while above it, there exists a giant component of the order of system size. In the matrix 110 of the current invention, comprising AC and CNT in a specified ratio, this percolation threshold is exceeded, based on the observed performance characteristics of the supercapacitor cell.

Returning to FIG. 1, in some embodiments, the conductive layer 102 may be made of a suitable electrically conductive material such as a metal foil. In some embodiments, the surface of the conductive layer 102 may be roughened, patterned, or otherwise texturized, e.g., to promote adhesion to the underlayer 104 or active layer 106, and good electrical conductance (i.e. a low interface resistance) to the underlayer 104 or active layer 106. For example, in some embodiments, the conductive layer may be etched (e.g., mechanically or chemically).

In some embodiments, the conductive layer 102 may be an aluminum, a nickel, or a copper foil.

In some embodiments, the conductive layer 102 may have a thickness in the range of 1 µm to 1,000 µm or any subrange thereof such as 5 µm to 50 µm.

In some embodiments, the underlayer 104 may be omitted, such that the active layer 106 is disposed directly on the conductive layer 102.

In some embodiments, the underlayer 104 may comprise mostly $sp^2$ hybridized carbon. For example, in some embodiments, the underlayer 104 may be at least 20 wt. %, preferably more than 40 wt. %, more preferably more than 60%, and most preferably more than 70 wt. % $sp^2$ carbon and has a preferred thickness of 0.01 µm to 10 µm, more preferably 0.1 µm to 5 µm, and most preferably 0.5 µm to 3 µm.

In some embodiments, the underlayer 104 contains less than 10 wt. % carbon in CNT form. Preferably, the underlayer 104 contains less than 5 wt. % carbon in CNT form, or does not contain any carbon in CNT form.

In some embodiments, underlayer 104 may be formed by physical vapor deposition (sputtering), ion beam deposition, chemical vapor deposition, plasma enhanced chemical vapor deposition, spray-coating, screen-printing, or by coating from a slurry.

Figure 3:
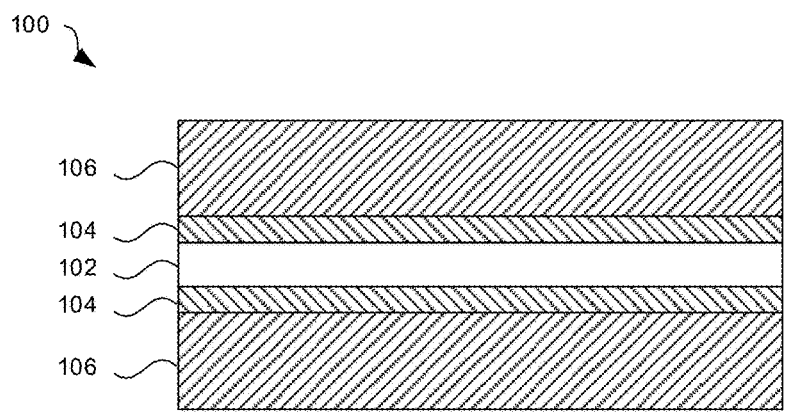
FIG. 3 is a schematic of a two-sided electrode.

In some embodiments, the electrode 100 may be double sided (see FIG. 3), with an underlayer 104 and active layer 106 formed on each of two opposite-facing major surfaces of the conductive layer 102. In some embodiments, the underlayer 104 may be omitted on one or both sides of the two-sided electrode 100.

The third aspect of the present invention is directed to a method of preparing an aqueous surfactant-free dispersion of activated carbon (AC) and carbon nanotubes (CNT). The method comprises the steps of: mixing activated carbon and the carbon nanotubes in an aqueous solution without a surfactant, wherein the carbon nanotubes have a purity of at least 95 wt. %, and applying a high shear to the mixture at a shear rate of at least 800,000 $s^{-1}$.

The inventors have discovered that high purity of CNTs (at least 95 wt. %, or 97 wt. %, or 99 wt. %) significantly improves the stability of an aqueous dispersion comprising activated carbon and CNT. The inventors have also found that the stability of a dispersion of AC (75-85 wt. %) and CNT (15-25 wt. %) in water without the use of surfactants is increased significantly, typically for at least two weeks, at least 1 month, at least 3 months, at least 6 months, at least 1 year, or at least 2 years, when the CNT is of at least 95 wt. % purity, has a Raman G/D integrated peak area ratio of at least 20, and is exposed to a high shear process imparting a shear rate of at least 800,000 $s_{-1}$. The shear rate is preferably greater than 1,000,000 $s^{-1}$, and more preferably greater than 10,000,000 $s^{-1}$. The maximum applied shear rate should not exceed 1,000,000,000 $s^{-1}$, and preferably should not exceed 100,000,000 $s^{-1}$, as exceeding this level of shear may cause unacceptable damage to the carbon.

In general, water is a preferred solvent for preparing the active layer over organic solvents like isopropyl alcohol (IPA), methanol, ethanol, N-methyl-2-pyrrolidone (NMP), dichloromethane (DCM), dimethyl sulfoxide (DMSO), dimethylcarbonate (DMC), propylene carbonate (PC), acetonitrile (ACN), and the like for environmental, economic, and toxicological reasons. A stable aqueous dispersion of AC and CNT provides substantially useful advantages over carbon dispersions in these organic solvents, which are hazardous to the environment and human health, and costlier in terms of both raw material and processing. However, IPA and NMP can also be used as a solvent to prepare a stable dispersion of AC and CNT. In one embodiment, a stable dispersion of carbon in IPA comprises 75-85 wt. % activated carbon, and 15-25 wt. % CNTs in IPA, wherein the purity of the CNTs is at least 95 wt. %; the dispersion is free of surfactant; and is stable for at least two weeks.

In some embodiments, the high shear rates can be achieved by passing the aqueous AC-CNT suspension at high velocity, for example 100 m/s, through a channel or channels, the channels having diameters or cross-sectional dimensions between a few tens and a few hundreds of micrometers, with at least one diameter or cross-section of preferably 200 µm or less, more preferably 150 µm or less, and most preferably 100 µm or less. For example, the aqueous AC-CNT suspension is passed through a first channel that has a cross section of 300 µm and a second channel that has a cross section of 100 µm.

The high shear process is continued until a dispersion is obtained that exhibits a viscosity suitable for a coating process. The preferred viscosity of the dispersion over the temperature range of 20-80° C. is in the range of 5,000 to 100,000 cP, more preferably in the range of 7,000 to 70,000 cP, and most preferably in the range of 10,000 to 50,000 cP.

Figure 4:
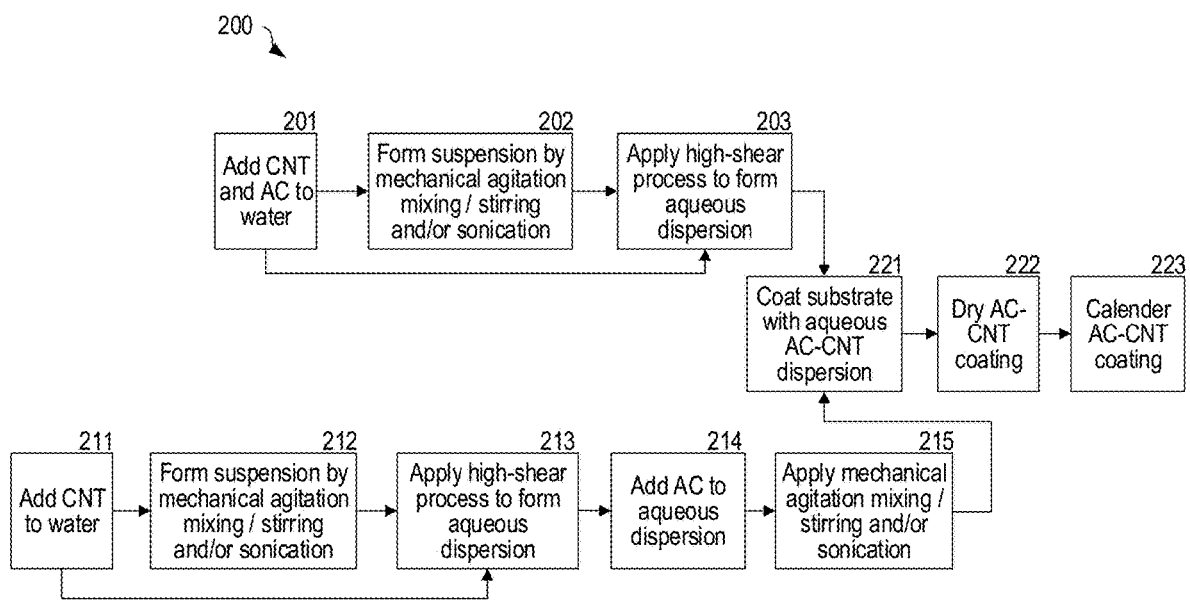
FIG. 4 is a flow chart illustrating a method of making an active layer for an electrode.

Referring to FIG. 4, an exemplary embodiment of method 200 of making the active layer 106 of electrode 100 is described. In step 201, AC and CNT in the desired ratio in the range of 70:30 wt. % to 90:10 wt. %, preferably 75:25 wt. % to 85:15 wt. %, or more preferably 80:20 wt. % are added to water. The preferred concentration of carbonaceous material (AC and CNT) in water is 20 to 40 g/liter, more preferably 25 to 35 g/liter, and most preferably 30 g/liter. In an optional subsequent step 202 an aqueous suspension of AC and CNT is formed by adding mechanical energy in the form of mixing or stirring by an impeller and/or by bath sonication for a period that ensures adequate mixing of the AC and CNT in water. For example, the impeller may be operated at 500 rpm and a torque of 60 N cm and the bath sonicator may be operated at 37 Hz, 100 W and 25° C. for about 1 hour.

No surfactants or dispersing agents are added in either of steps 201 or 202 to avoid the presence of impurities derived from these surfactants at the completion of the method 200. The aqueous AC-CNT suspension, in the absence of surfactants, typically remains in solution without sedimentation for between 1 and 6 hours.

In step 203, the suspension of AC and CNT in water is exposed to a high shear process in a high shear rotary mixer or by passing it through a channel or channels having a diameter between a few tens and a few hundreds of micrometers, in order to debundle the CNT and to form a stable dispersion. The aqueous AC-CNT dispersion, in the absence of surfactants, is typically stable for at least 2 weeks and for up to 2 years.

In another embodiment of method 200 of making the active layer 106 of electrode 100, only CNT is added to water in a first step 211. The preferred CNT concentration in water is between 4 and 8 g/L, more preferably between 5 and 7 g/L, or 6 g/L. In an optional subsequent step 212 an aqueous suspension of CNT is formed by adding mechanical energy in the form of mixing or stirring by an impeller and/or by bath sonication for period that is adequate to ensure good mixing of the CNT in water. For example, the impeller is operated at 500 rpm and a torque of 60 N cm and the bath sonicator is operated at 37 Hz, 100 W and 25° C. for about 1 hour. No surfactants or dispersing agents are added in either of steps 211 or 212 to avoid the presence of impurities derived from these substances at the completion of the method 200. The aqueous CNT suspension, in the absence of surfactants, typically remains in solution without sedimentation for between 1 and 6 hours.

In step 213, the suspension of CNT in water is exposed to a high shear process in a high shear rotary mixer or by passing it through a channel or channels having a diameter between a few tens and a few hundreds of micrometers, in order to debundle the CNT and to form a stable CNT dispersion. The aqueous CNT dispersion, in the absence of surfactants, is typically stable for at least 2 weeks, at least 1 month, at least 3 months, at least 6 months, at least 1 year, or at least 2 years.

In step 214 AC is subsequently added to the CNT dispersion in the desired AC to CNT ratio in the range of 70:30 wt. % to 90:10 wt. %, more preferably 75:25 wt. % to 85:15 wt. %, or most preferably 80:20 wt. %. The preferred concentration of carbonaceous material (AC and CNT) in water is 20 to 40 g/liter, more preferably 25 to 35 g/liter, and most preferably 30 g/liter. In step 215 mechanical energy is added in the form of mixing or stirring by an impeller and/or by bath sonication for a period that ensures adequate mixing of the AC and CNT in water. For example, the impeller is operated at 500 rpm and a torque of 60 N cm and the bath sonicator is operated at 37 Hz, 100 W and 25° C. for about 1 hour. The aqueous AC-CNT dispersion, in the absence of surfactants, is typically stable for at least 2 weeks, at least 1 month, at least 3 months, at least 6 months, at least 1 year, or at least 2 years.

In step 221, the dispersion is applied to either the underlayer layer 104 or, if the underlayer 104 is omitted, the conductive layer 102 of the electrode 100 by a suitable process such as knife coating or slot-die coating.

In step 222, the active layer is dried by convective heating in air or in an inert gas, or infrared heating, by exposing the active layer 102 to an elevated temperature for a specified duration, for example, 90° C. for 40 minutes, in the area to be dried.

In step 223, the electrode 100 coated with the active layer 102 is calendered under an applied set pressure, for example, between about 23,000 psi and 235,000 psi, to compress the active layer to its final thickness.

For example, a dispersion of AC:CNT 80:20 wt. % is applied with a knife-gap of 4 mm, dried at 90° C. and calendered under a pressure of 46,000 psi, producing an active layer with a final thickness of 100 μm.

For example, a dispersion of AC:CNT 80:20 wt. % is applied with a knife-gap of 6 mm, dried at 90° C. and calendered under a pressure of 46,000 psi, producing an active layer with a final thickness of 150 μm.

In the fourth aspect, the present invention is directed to a method of coating a substrate such as a current collector or a current collector primed with a carbon underlayer. The method comprises knife coating or slot-die coating an aqueous dispersion onto a substrate, wherein the dispersion comprises activated carbon and carbon nanotubes without any surfactant and has a viscosity in the range of 5,000 to 100,000 cP, and the carbon nanotubes have a purity of at least 95 wt. %.

Advantageously, in some embodiments, the method 200 for forming the active layer 106 may be implemented as a roll-to-roll process (e.g., to allow volume production of electrode sheets several tens of meters long or more).

Figure 5:
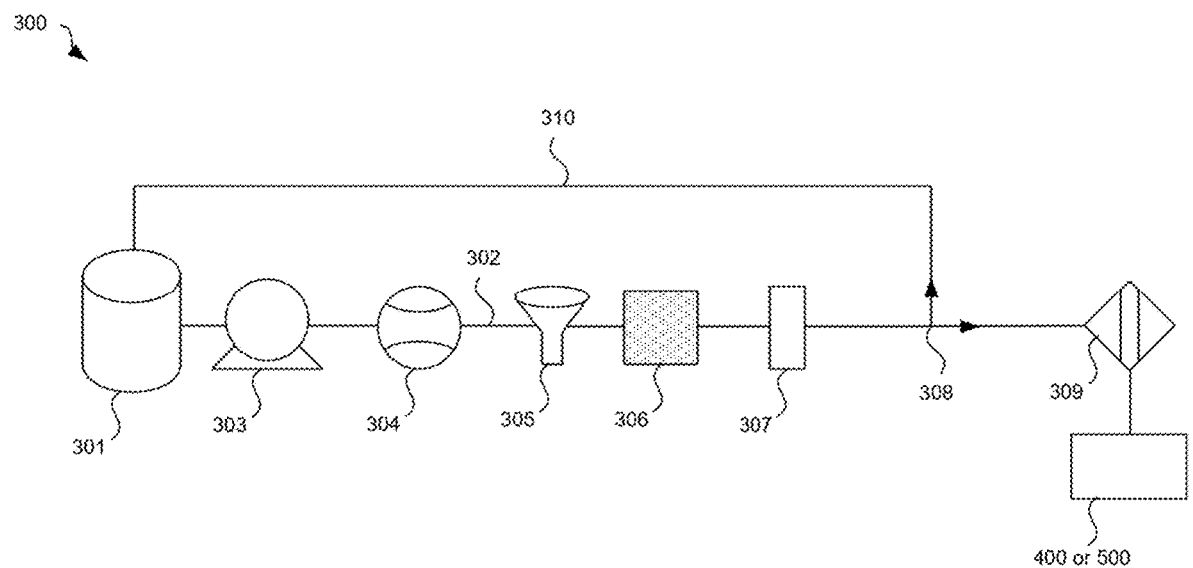
FIG. 5 is a schematic diagram of an exemplary mixing apparatus.

FIG. 5 shows an exemplary apparatus 300 for making the active layer 106 of electrode 100.

The apparatus 300 includes vessel 301. In some embodiments, the aqueous AC-CNT suspension may initially be formed in vessel 301. In other embodiments, the mixture may be formed elsewhere and then transferred to the vessel 301.

In some embodiments the vessel 301 may include a stirring mechanism, such as an impeller operated at a controlled speed or another device known in the art.

In some embodiments, the vessel 301 may include one or more devices for homogenizing, such as a sonicator or other device known in the art.

In some embodiments, the vessel 301 may be temperature controlled, e.g., using one or more heating and/or cooling elements such as electric heaters, tubing for circulating chilled water, or any other such devices known in the art.

The aqueous AC-CNT suspension in vessel 301 is passed through a flow line 302, e.g. a pipe or tubing, using a pump 303. Pump 303 may be any suitable configuration, such as a peristaltic pump. A flow meter 304 may be provided to measure the rate of the mixture to flow through the flow line 302. A filter 305 may be provided to filter the mixture flowing through the flow line 302, e.g., to remove clumps of solid material having a size above a desired threshold.

In some embodiments, the aqueous AC-CNT suspension is passed through a channel or channels 306 having diameters or cross-sectional dimensions between a few tens and a few hundreds of micrometers, with at least one diameter or cross-section of preferably 200 μm or less, more preferably 150 μm or less, and most preferably 100 μm or less. The CNT in the aqueous AC-CNT mixture is debundled by being exposed to high shear.

In some embodiments, a temperature control device 307, such as a heat exchanger arranged in a sleeve disposed about the flow line 302, is provided to control the temperature of the aqueous AC-CNT dispersion flowing through the flow line 302.

In some embodiments a valve 308 is provided which can be selectively controlled to direct a first portion of the aqueous AC-CNT dispersion to flow through return flow line 310 to be recirculated back to vessel 301, while a second portion is output externally, e.g., to a coating apparatus 400.

In some embodiments, a sensor 309 such as a pressure sensor and/or flow rate sensor is provided to sense one or more aspects of the output portion of dispersion.

In various embodiments any or all of the elements of apparatus 300 may be operatively connected to one or more computing devices to provide for automatic monitoring and/or control of the mixing apparatus 300.

Figure 6:
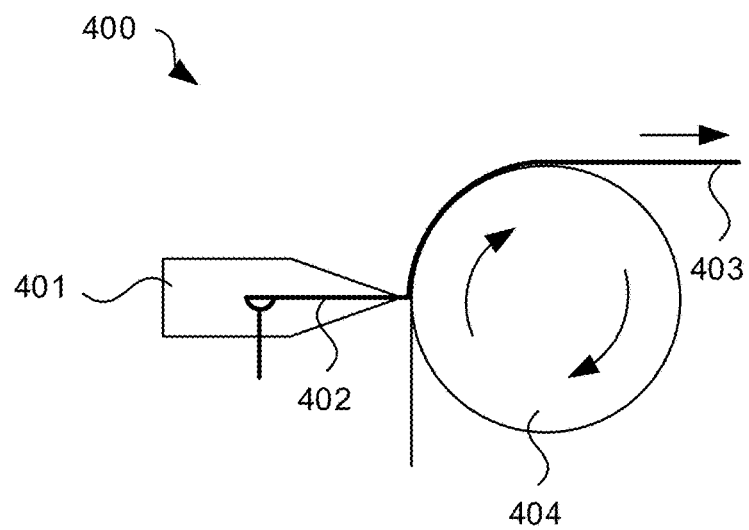
FIG. 6 is a schematic diagram of coating apparatus featuring a slot die.

In various embodiments, the coating apparatus 400 may be any suitable type known in the art. For example, FIG. 6 shows an exemplary embodiment of coating apparatus 400 featuring a slot die 401 that distributes the aqueous AC-CNT dispersion received from a source such as the apparatus 300 through a distribution channel 402 onto a substrate 403 (e.g., the conductive layer 102, either bare or already coated with underlayer 104) which moves across a roller 404. Setting the height of the slot die above the substrate 403 on the roller 404 and controlling the flow rate and/or pressure of the dispersion in channel 402 allows for control of the thickness and density of the applied coating. In some embodiments, channel 402 may include one or more reservoirs to help ensure consistent flow of the aqueous AC-CNT dispersion to provide uniform coating during operation.

Figure 7:
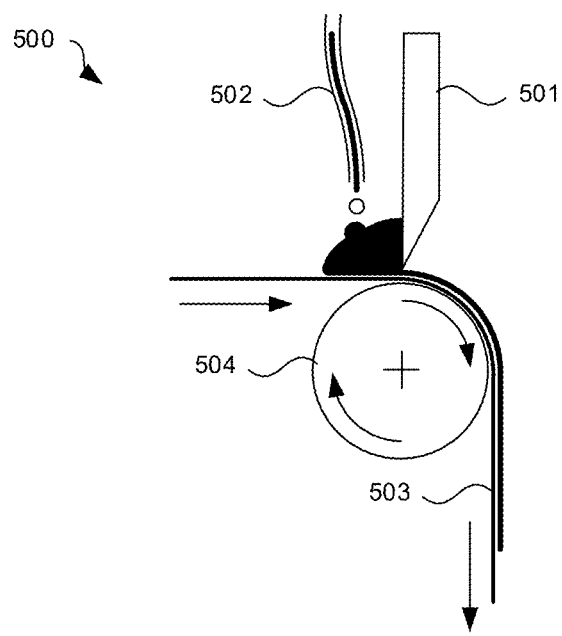
FIG. 7 is a schematic diagram of coating apparatus featuring a doctor blade.

Referring to FIG. 7, in various embodiments the coating apparatus 500 features a doctor blade 501 that levels the dispersion received from a source such as the apparatus 300 that is applied through one or more applicators 502 (one is shown) onto a substrate 503 (e.g., the conductive layer 102, either bare or already coated with underlayer 104) which moves across a roller 504. The direction of travel of the substrate 503 is indicated by the arrows. Setting the height of the doctor blade 501 above the substrate 503 on the roller 504 and controlling the flow rate and/or pressure of the AC-CNT dispersion through the applicator 502 allows for control of the thickness and density of the applied coating. Although a single doctor blade 501 is shown, multiple blades may be used, e.g., a first blade to set a rough thickness of the coating, and a second blade positioned down line from the first blade to provide fine smoothing of the coating.

While the process above has been described for forming AC-CNT electrodes without the presence of carbon black (CB), a small amount of CB may be added during step 201 or 214 of method 200, for example between about 1 and 6 wt. %, to decrease the overall equivalent series resistance (ESR) of the supercapacitor cell. For an electrode formulation containing carbon black, the ratio of AC:CNT:CB is adjusted to x:y-z:z wt. %, respectively; i.e., the amount of CNT is reduced by the amount of CB added. For example, one embodiment of an electrode formulation comprises AC:CNT:CB in the ratio 80:15:5 wt. %. While the presence of a small amount of carbon black may reduce cell ESR, due to the inability of carbon black to store charge, the volumetric capacitance of a cell with AC-CNT-CB electrodes will be lower compared to a cell of the same design with AC-CNT electrodes.

Figure 8:
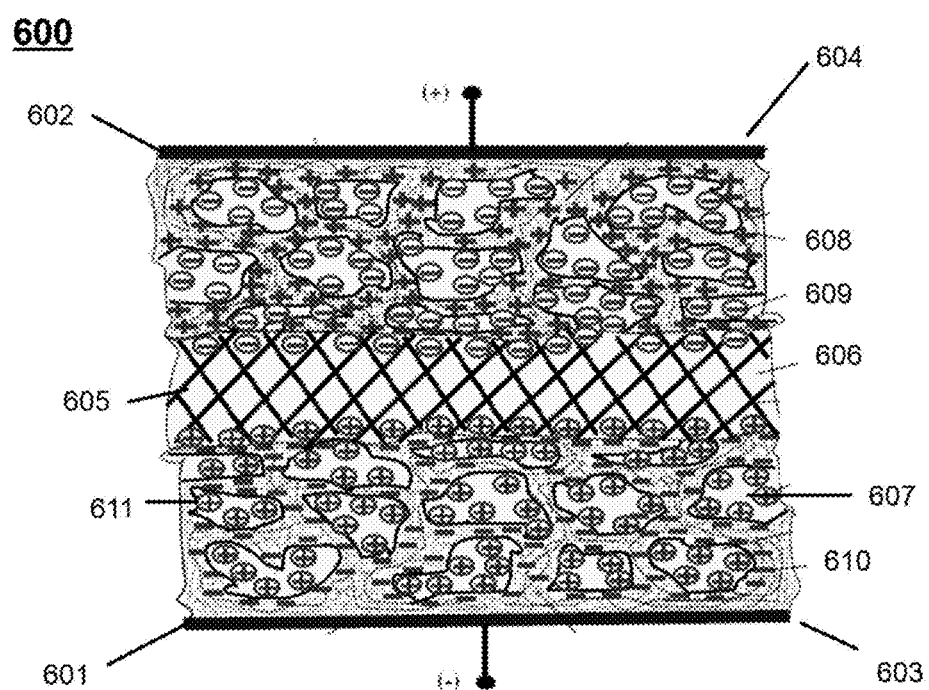
FIG. 8 is a schematic of a supercapacitor cell.

FIG. 8 shows an exemplary embodiment of a supercapacitor 600 (Obreja, *Physica E* 40 (2008), 2596-2605).

The exemplary supercapacitor 600 cell is an electric double-layer capacitor (EDLC). The EDLC includes at least one pair of electrodes 603 and 604 with pore structure 607 (where the electrodes 603 may be referred to as a negative electrode and 604 as a positive electrode merely for purposes of referencing herein). When assembled into the supercapacitor 600, each of the electrodes 603 and 604 (which may each be an electrode 100 of the type shown in FIG. 1) presents a double layer of charge at an electrolyte interface. In some embodiments, a plurality of electrodes 603 and 604 is included. However, for purposes of discussion, only one pair of electrodes 603 and 604 are shown. As a matter of convention herein, at least one, but more typically both of the electrodes 603 and 604 comprise a binder-free, surfactant-free AC-CNT active layer (e.g., the active layer 106 of electrode 100 shown in FIG. 1) with pore structure 607.

Each of the electrodes 603 and 604 includes a respective current collector 601 and 602, respectively (also referred to as a "charge collector"), which may be the conductive layer 102 of electrode 100 shown in FIG. 1. In some embodiments, the electrodes 603 and 604 are separated by a separator 605. In general, the separator 605 is a thin structural, porous, non-conducting material (usually a sheet of cellulose or polymer) used to separate the negative electrode 603 from the positive electrode 604. Once assembled, the electrodes 603 and 604 and the separator 605 provide a storage cell 600.

At least one form of electrolyte 606 conducting electricity by ionic transport is included in the supercapacitor 600. The electrolyte is comprised either of a salt dissolved in an aqueous or organic solvent, or an ionic liquid, and the dissolved salt or ionic liquid is dissociated into negative ions (anions) 609 and positive ions (cations) 611. The electrolyte 606 impregnates the porous separator 605 and the pore structure 607 in the active layer and fills the space within the electrodes 603 and 604.

In some embodiments the electrolyte comprises about 1.8M triethyl-methyl-ammonium-tetrafluoroborate (TEMA-BF4) dissolved in at least 99.9% pure, preferably at least 99.99% pure propylene carbonate (PC).

In some embodiments the electrolyte comprises 1M tetraethyl-ammonium-tetrafluoroborate (TEA-BF4) dissolved in at least 99.9% pure, preferably at least 99.99% pure acetonitrile (ACN).

In some embodiments the electrolyte comprises 1M tetraethyl-ammonium-tetrafluoroborate (TEA-BF4) dissolved in at least 99.9% pure, preferably at least 99.99% pure propionitrile (PN).

In some embodiments the electrolyte comprises 1.5M 5-azoniaspiro[4.4]nonane-tetrafluoroborate (SPB-BF4) dissolved in at least 99.9% pure, preferably at least 99.99% pure mixture of PC with an aliphatic additive such as dimethyl carbonate (DMC).

In some embodiments the volumes of the positive and negative electrodes are essentially the same, as determined by their respective thicknesses and areas. For example, the two electrodes may both have thickness about 100 um and an area of about 3 $cm^2$. Since the radii of the anion and cation of the electrolytes are different, for example, the anion may be smaller than the cation as in the case of the BF4 anion and the TEA or TEMA cation, it may be advantageous for the anode and cathode to have different volumes, by varying either the thickness or area of one versus the other. For example, the ratio of the volumes of the two electrodes is between 1 and 1.25. For example, the capacitance of the positive electrode may be 10% larger than the capacitance of the negative electrode owing to the faster diffusion and lower desolvation energy of the anions versus the cations. In that case, a negative electrode with 10% greater volume than the positive electrode, for example, either 10% thicker or 10% larger in area, is advantageous.

When bias voltage is applied between the two electrodes, a layer of positive charge 608 is formed at the exposed pore surface of one electrode and causes attraction of negative ions 609 from electrolyte 606 and a layer of negative charge 610 at the exposed pore surface of the other electrode causes attraction of positive ions 611 from electrolyte 606. Thus, an electric double layer is formed at either internal electrode surface and high capacitance value is reached.

In some embodiments, a supercapacitor storage cell is formed by packaging supercapacitor cell 600 into a hermetically sealed housing 900, either as a pouch cell with generally flat electrodes, or a cylindrical cell, or prismatic cell with tightly wound electrodes.

Figure 9:
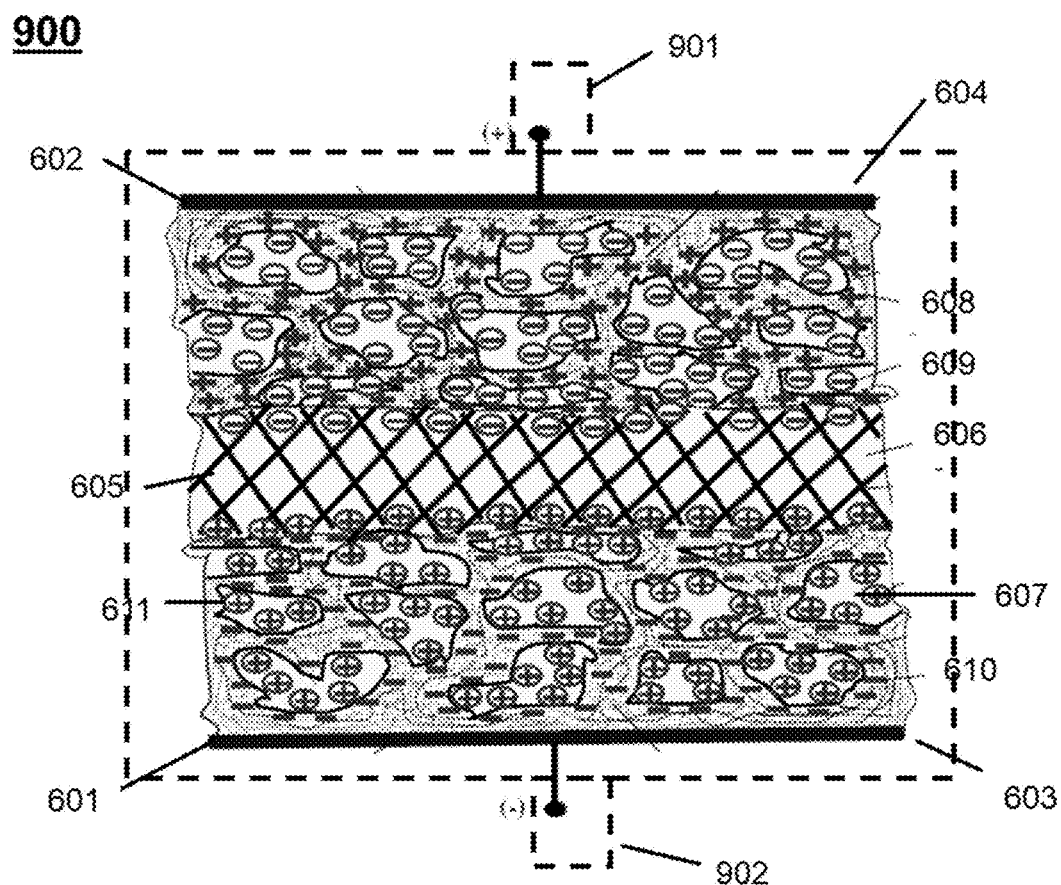
FIG. 9 is a schematic of a packaged supercapacitor cell.

Referring to FIG. 9, the cells are hermetically sealed by welding techniques known to people skilled in the art, such as making use of laser, ultrasonic, or other welding technologies. In addition to providing robust physical protection of the storage cell 600, the housing 900 is configured with external contacts to provide electrical communication with respective terminals 901 and 902 within the housing 900. Each of the terminals 901 and 902, in turn, provides electrical access to energy stored in the active layers of electrodes 603 and 604, respectively, generally through electrical leads which are coupled to the electrodes 603 and 604, respectively. A supercapacitor cell is rated at a nominal capacitance expressed in Farad (F) and a maximum operating voltage (V). A multiplicity of supercapacitor cells 900 may be joined together into a bank by electrically connecting them in series, in parallel, or in a combination thereof. Electrical connection of cells in series will increase the maximum operating voltage while decreasing the nominal capacitance of the couple. Electrical connection of cells in parallel will increase the nominal capacitance of the couple. For example, electrically connecting two 1 F/2.5 V cells in series will provide a 0.5 F/5 V cell-couple. For example, electrically connecting two 1 F/2.5 V cells in parallel will provide a 2 F/2.5 V cell-couple. For example, electrically connecting two groups of two 1 F/2.5 V cells in series and connecting the two groups in parallel will provide a 1 F/5 V cell-couple.

EXAMPLES

Example 1—Performance Characteristics of Supercapacitor Cells with AC-CNT Electrodes of Various Formulations Containing Purified CNT AC-CNT Dispersion Processing For a 1 L dispersion volume quantity, 24 grams of activated carbon powder with a BET surface area of about 1,900 m$^2$/g along with 6 grams of ≥98 wt. % purified CNT powder with a surface of about 800 m$^2$/g and a Raman G/D integrated peak area ratio of >30 were introduced into water and premixed for 30 minutes by impeller mixing and bath sonication, followed by 3 repeated passes through a 300 μm channel and an 87 μm channel connected in series. The aqueous dispersion product was AC-CNT (80:20 wt. %)—water dispersion at 30 g/L concentration. This aqueous dispersion was stable for at least 2 weeks upon standing at 20° C.

Knife Coating of AC-CNT onto Al Current Collector with a Carbon Underlayer

Figure 10:
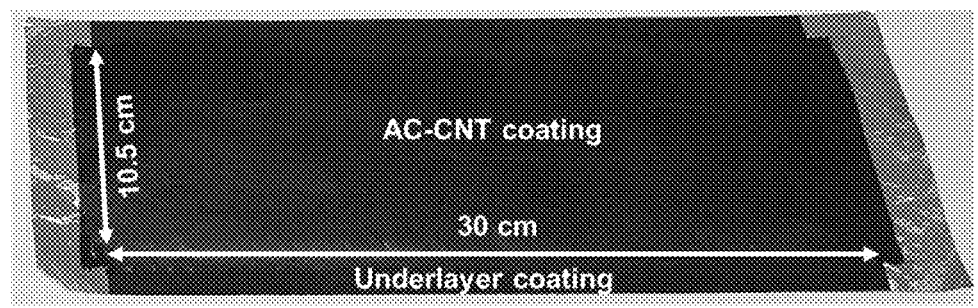
FIG. 10 is a photo of a dried and calendared AC-CNT coating on an underlayer on Al-foil.

The freshly prepared aqueous AC-CNT dispersion was knife coated onto sheets of a commercial Al current collector foil primed with an underlayer comprising >50% sp$^2$ carbon. The knife gap was set around 4.0 mm to obtain a final coating thickness 100 μm. The full stage length of ~30 cm was used for knife coating the AC-CNT dispersions. FIG. 10 shows an example of a large area AC-CNT coating fabricated using the knife coater over the entire stage after drying. The average time to dry one such coating using dual heat guns was 35 minutes. The dried AC-CNT coatings had good adhesion to the underlying carbon-primed Al current collector without showing signs of delamination. The large area AC-CNT coatings were calendered at a pressure of 46,000 psi and a speed of 3 m/min through a roll-press using a pair of cover foils, prior to vacuum oven drying at 200° C. for 16 hours.

Electrodes for Pouch Monocell Assembly

Electrodes of dimensions 15 mm×20 mm were punched from various 100 μm thick AC-CNT coated aluminum strips for assembly into pouch monocells. A 20 μm thick cellulose separator was incorporated into the pouch cells which were filled with either PC- or ACN-based electrolytes. Twenty (20) EDLC pouch monocells were assembled—ten (10) cells with PC electrolyte with 1.8M TEA-BF4 salt, and ten (10) cells with ACN electrolyte with 1M TEMA-BF4 salt.

AC-CNT Cells with PC Electrolyte

Figure 11:
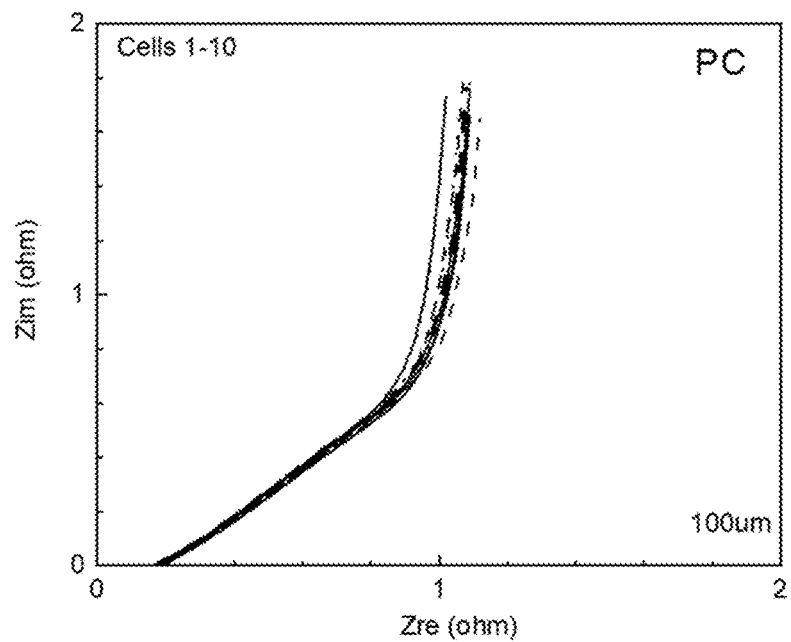
FIG. 11 shows the Nyquist plots of AC-CNT 80:20 wt. % cells with PC electrolyte.

From the cumulative plot of the ten Nyquist profiles for EDLC pouch monocells containing the AC-CNT 80:20 electrodes and a PC-based electrolyte shown in FIG. 11, it can be seen that there was relatively low spread in ESR values among cells. Of note is that there are no ESR semi-circle artifacts at high frequency, indicating good adhesion of the 100 μm thick AC-CNT active layer to the carbon-primed Al current collector. The Warburg diffusion artifact at high to mid-frequencies is characteristic of the thick electrodes in PC solvent. The average cell ESR value at 1 kHz frequency was 0.63±0.02 Ω·cm$^2$. The average cell response time as measured by a phase angle of 45 degrees between the imaginary and real part of the impedance is 5.0 seconds.

AC-CNT Cells with ACN Electrolyte

Figure 12:
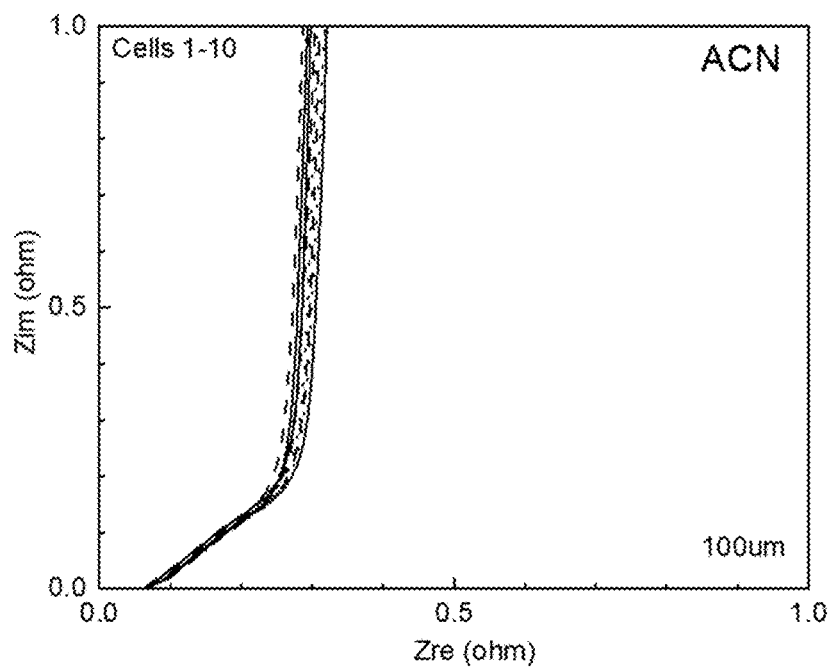
FIG. 12 shows the Nyquist plots of AC-CNT 80:20 wt. % cells with ACN electrolyte.

FIG. 12 shows the Nyquist profiles of the respective EDLC pouch monocells containing the AC-CNT 80:20 electrodes and an ACN-based electrolyte. Similar to the PC-filled cells, there are no ESR semi-circle artifacts at high frequency, indicating good adhesion of the 100 μm thick AC-CNT active layer to the primed Al current collector. The Warburg diffusion artifact at high to mid-frequencies is still prevalent, however, it is of significantly lower magnitude compared to the same electrodes in PC solvent. The average cell ESR value at 1 kHz frequency was 0.23±0.02 Ω·cm$^2$. The average cell response time as measured by a phase angle of 45 degrees between the imaginary and real part of the impedance is 1.4 seconds.

Table 1 summarizes the EDLC performance characteristics of cells with AC-CNT electrodes of various formulations.

TABLE 1

| Formulation (AC:CNT) | Thickness | Cell Electrolyte | ESR (Ω · cm$^2$) | Response Time (s) | Capacitance (F) | Volumetric Capacitance (F/cm$^3$) |
|---|---|---|---|---|---|---|
| 80:20 | 100 μm | PC | 0.631 | 5.0 | 1.05 ± 0.03 | 19 |
| | | ACN | 0.227 | 1.4 | 1.10 ± 0.06 | 20 |
| 85:15 | 100 μm | PC | 0.520 | 5.0 | 1.11 ± 0.02 | 20 |
| | | ACN | 0.190 | 1.3 | 1.06 ± 0.05 | 19 |
| 90:10 | 100 μm | PC | 0.639 | 5.0 | 1.06 ± 0.02 | 19 |
| | | ACN | 0.197 | 1.3 | 1.00 ± 0.04 | 19 |

Example 2—Stability of Carbon Dispersions

Carbon dispersions were prepared from either 100% carbon nanotubes (CNT) or a mixture of 20 wt. % CNT and 80 wt. % activated carbon, in either deionized water or isopropyl alcohol (IPA). CNT having three different levels of purity, about 85 wt. %, about 97.5 wt. %, and about 99 wt. %, were used to prepare the dispersions. No surfactants or other components were added to the dispersions during the preparation process.

All dispersions were prepared by first combining the carbon component and the solvent component (water or IPA) in a container, then mixing the components with an impeller mixer operating at 500 rpm and a torque of 60 N-cm, while simultaneously ultrasonicating in a bath at 37 Hz, 100 w, and 25° C. for 1 hour. The resulting suspension was then subjected to high shear by passing it three times through two channels in series having cross sections of 300 μm and 100 μm, at a pressure of 25,000 psi. The resulting dispersion was collected in a glass jar and sealed. The dispersion in the jar was observed for visual evidence of separation of the carbon from the solvent, or sedimentation of the carbon at the bottom of the container. The Duration of Stability was determined as the length of time for which no such separation of sedimentation was observed visually in the jar.

As shown in Table 2, dispersions prepared in water solvent with CNT having purity of 85 wt. %, showed inferior stability, whether prepared with CNT only or as a mixture of AC and CNT. In contrast, dispersions prepared in water solvent with CNT having purity of 97 wt. % or 99 wt. %, whether prepared with CNT only or as a mixture of AC and CNT, showed superior stability with no separation or sedimentation observed after at least 6 months. Dispersions prepared in IPA, for all CNT purity levels and compositions, showed stability equivalent to dispersions prepared in water using CNT having 97 wt. % or 99 wt. % purity.

TABLE 2

| Carbon Composition | CNT Purity (wt. %) | Carbon Conc (g/L) | Solvent | Duration of Stability |
|---|---|---|---|---|
| CNT | 85 | 11 | Water | 5 min |
| CNT | 97 | 11 | Water | >6 months |
| CNT | 99 | 11 | Water | >6 months |
| 80 AC:20 CNT | 85 | 30 | Water | 20 min |
| 80 AC:20 CNT | 97 | 30 | Water | >6 months |
| 80 AC:20 CNT | 99 | 30 | Water | >6 months |
| CNT | 85 | 11 | IPA | >6 months |
| CNT | 97 | 11 | IPA | >6 months |
| CNT | 99 | 11 | IPA | >6 months |
| 80 AC:20 CNT | 85 | 15 | IPA | >6 months |
| 80 AC:20 CNT | 97 | 15 | IPA | >6 months |
| 80 AC:20 CNT | 99 | 15 | IPA | >6 months |

Example 3—Lifetime Performance Data Comparison Between Supercapacitor Cells with AC-CNT Electrodes Containing Non-Purified and ≥98 wt. % Purified CNT An aqueous surfactant-free AC-CNT dispersion with CNTs having purity of about 85 wt. % or less is not stable, as the CNTs settle out within a short amount of time, typically within about an hour or less (See Example 2). Since a suspension of AC-CNT with unpurified CNT, for example CNT with about 85 wt. % purity, in the absence of surfactants does not form a stable dispersion in water using the described high shear process, an AC-CNT suspension was prepared in isopropyl alcohol (IPA) instead of water and exposed to the same high shear process.

Hence, cells with AC-CNT active layers with high purity CNT that were formed from a water-based dispersion, were compared with cells with AC-CNT active layers with unpurified CNT that were formed from an IPA-based dispersion. Cells with PC- or ACN-based electrolyte were tested by 1,000 hours float testing at constant voltage and 100,000 constant current charge-discharge cycles.

Figure 13:
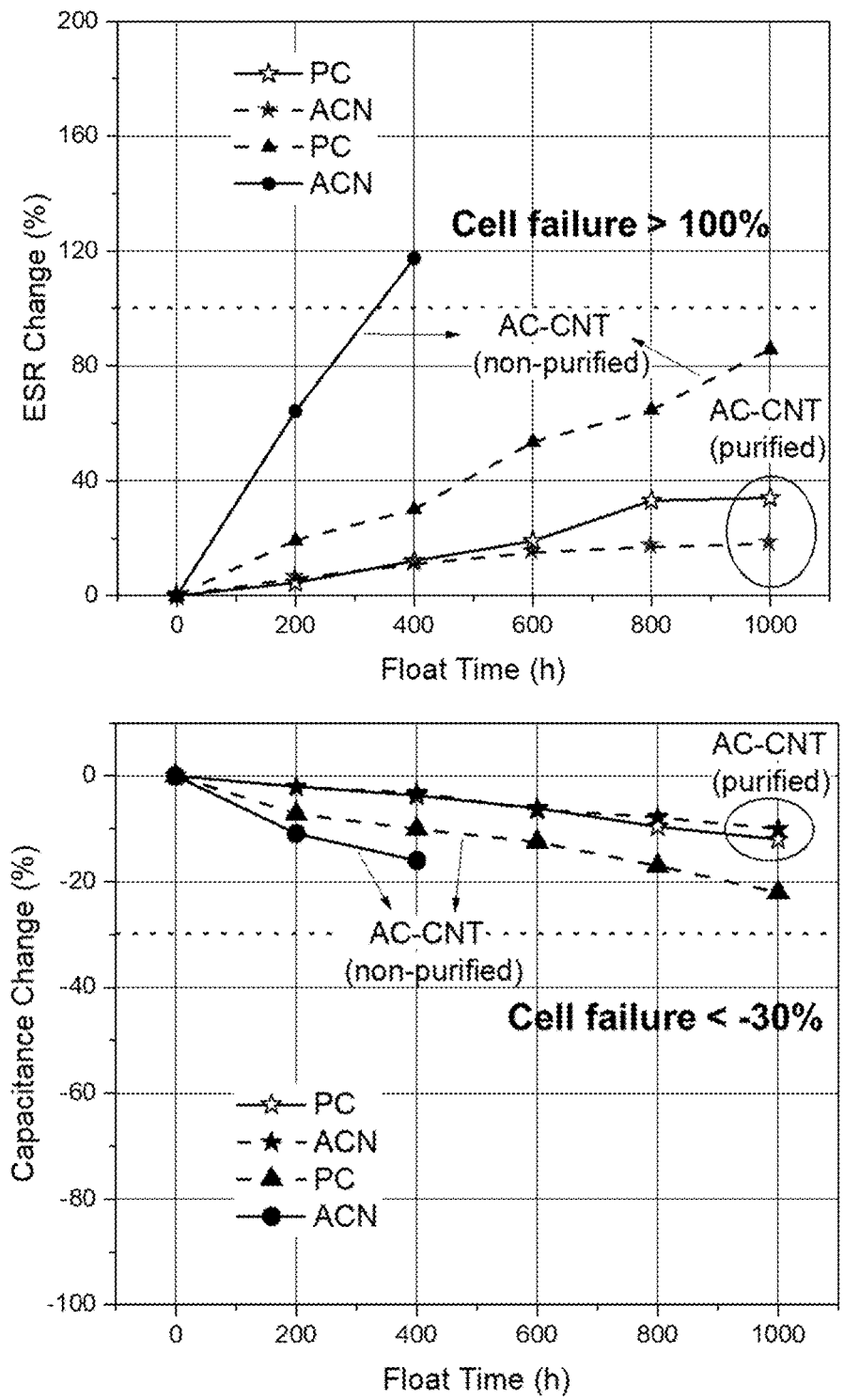
FIG. 13 shows the change of ESR and capacitance of AC-CNT 80:20 wt. % cells with PC/ACN electrolyte floating at a constant voltage of 2.7 V/2.5 V and 70° C. with ≥98 wt. %. pure CNT and <98 wt. % pure CNT.

1,000 h Float Test at 70° C.:

Floating was performed by holding the cell at a fixed voltage and an elevated temperature of 70° C. Cells with PC electrolyte were floated at 2.7 V, and cells with ACN electrolyte were floated at 2.5 V. As shown in FIG. 13, the change in both cell ESR and capacitance for the AC-CNT cells with non-purified CNT was notably larger than with AC-CNT cells using ≥98 wt. % purified CNT under identical test conditions. The AC-CNT cell with non-purified CNT (≤85 wt. % purity) and filled with ACN-based electrolyte failed after 400 h due to doubling of its cell ESR (●). This cell also had the largest fade in capacitance. At the end of the 1,000 h float test, the AC-CNT cell using non-purified CNT and filled with PC-based electrolyte showed 86% increase in ESR with 22% decrease in capacitance (▲). In contrast, both AC-CNT cells using ≥98 wt. % purified CNT performed significantly better than their AC-CNT (non-purified CNT) counterparts (☆ and ★).

100 k Cycling Test at 70° C.

Figure 14:
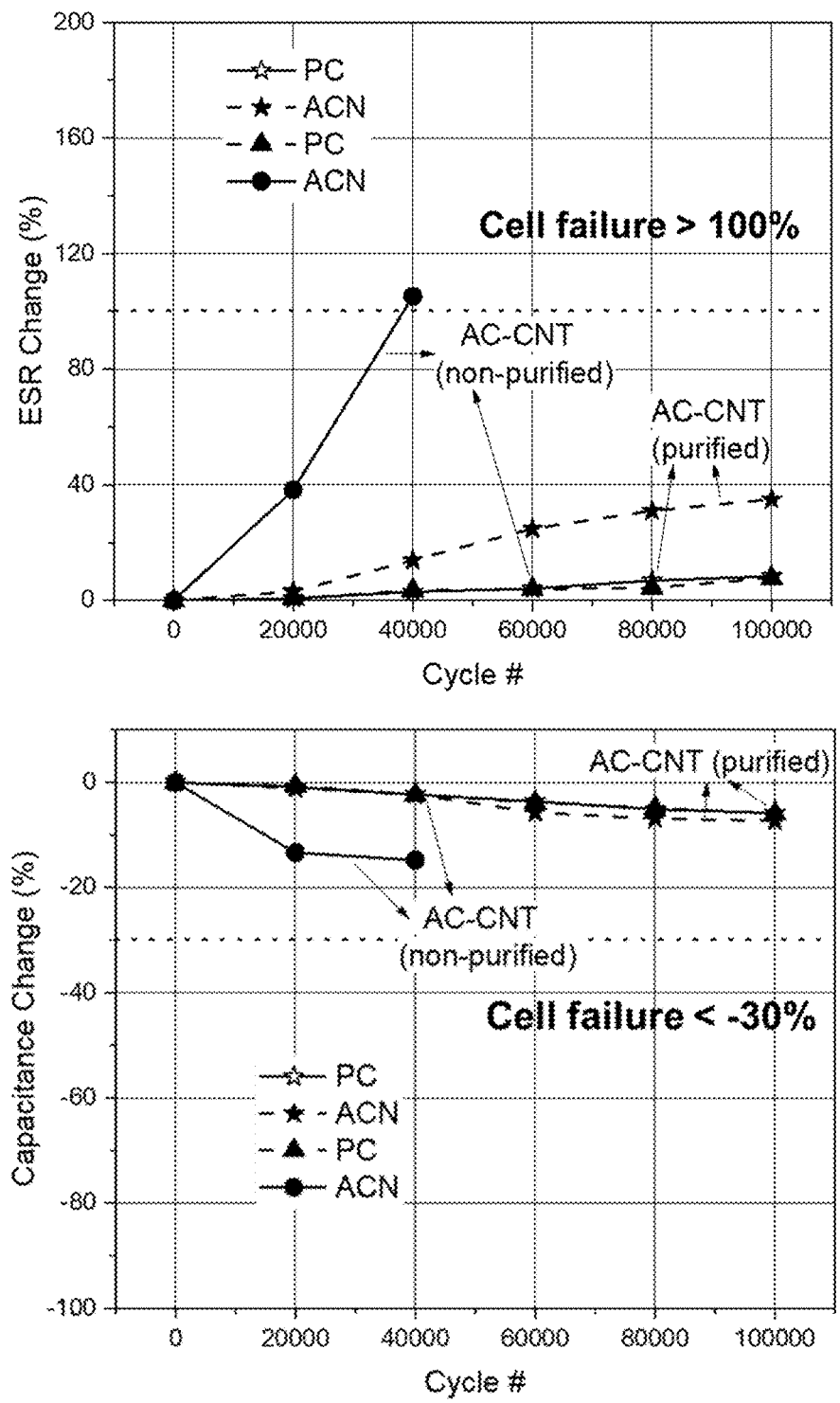
FIG. 14 shows the change of ESR and capacitance of AC-CNT 80:20 wt. % cells with PC/ACN electrolyte at 2.7 V/2.5 V repeated cycling at 70° C. with ≥98 wt. %. pure CNT and <98 wt. % pure CNT.

Cycling was performed by repetitive charging to 2.7 V and discharging to 0.1 V for cells with PC electrolyte and charging to 2.5 V and discharging to 0.1 V for cells with ACN electrolyte while holding the cell at an elevated temperature of 70° C. The ESR and capacitance changes of both types of AC-CNT cells in PC (2.7 V) and ACN (2.5 V) during the cycling test are shown in FIG. 14. The AC-CNT cell with non-purified CNT in PC electrolyte (▲) demonstrated similar cycling behavior compared to AC-CNT cells with ≥98 wt. % purified CNT in PC electrolyte (☆). However, when the filling electrolyte was ACN, the AC-CNT cell with non-purified CNT failed after only 40 k cycles, exhibiting 105% increase in ESR (●) with corresponding highest drop in capacitance. This is in sharp contrast to the AC-CNT pouch cell with ≥98 wt. % purified CNT filled with ACN-based electrolyte, which passed the 100 k cycling test, showing <40% increase in cell ESR and <10% fade in capacitance (★).

Table 3 summarizes the lifetime performance comparison between cells with AC-CNT electrodes containing non-purified (np) and purified (p) CNT.

TABLE 3

| | | | Reliability at 2.7 V (PC) or 2.5 V (ACN), 70° C. | |
|---|---|---|---|---|
| Electrode*/ Electrolyte | ESR ($\Omega \cdot cm^2$) | Capacitance (F) | 100K cycling | 1000 h floating |
| 100 μm AC-CNT(p)/PC | 0.7 | 1.2 | PASS | PASS |
| 100 μm AC-CNT(p)/ACN | 0.2 | 1.2 | PASS | PASS |
| 100 μm AC-CNT(np)/PC | 0.7 | 1.0 | PASS | PASS |
| 100 μm AC-CNT(np)/ACN | 0.2 | 0.9 | FAIL@40k | FAIL@400 h |

* p = purified (≥98 wt. %); np = non-purified

Figure 15:
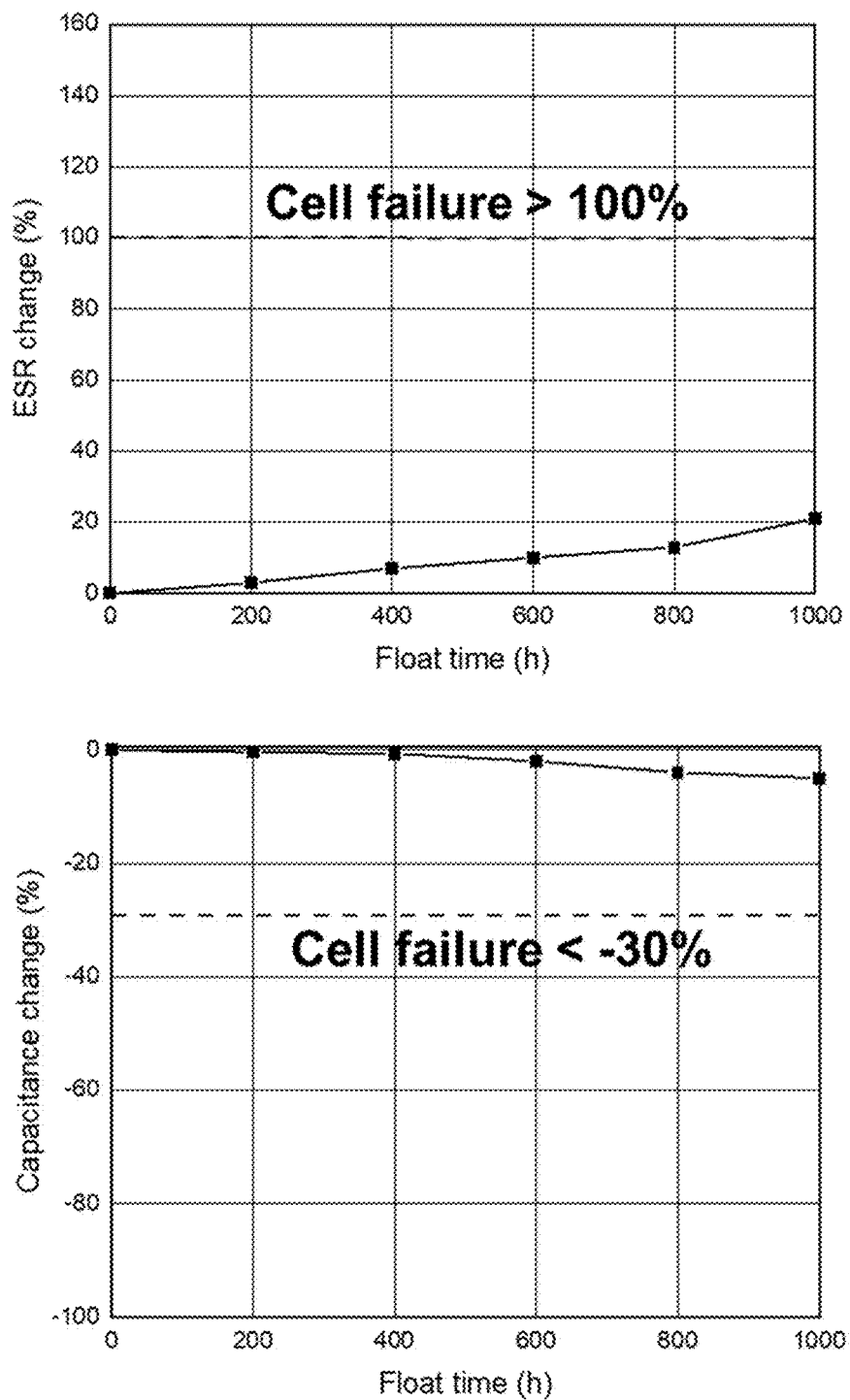
FIG. 15 shows the change in ESR and capacitance of AC-CNT 80:20 wt. % cells with PC-DMC electrolyte at 3 V and 70° C.

Example 4—Lifetime Performance Data of EDLC Cells Assembled from AC-CNT Electrodes at High Voltage The limitation of EDLC cells filled with conventional organic-based electrolytes PC and ACN is that they are limited to a maximum operational voltage of 2.7 V and 2.5 V, respectively. Operating such cells for extended period at voltages beyond their maximum operational voltage causes electrochemical decomposition of the electrolyte solvent and/or salt, leading to drastic and irreversible cell failure. The AC-CNT EDLC cells of the present invention were filled with a modified organic-based electrolyte consisting of a binary system of PC and the aliphatic additive dimethyl carbonate (DMC) and containing a 1.5M spiro-salt 5-azoniaspiro[4.4]nonane-tetrafluoroborate (SPB-BF4). The float lifetime performance of the AC-CNT cell coupled with this binary electrolyte at 3V, 70° C. operation is shown in FIG. 15. The cell shows only marginal increase in ESR (20%) with negligible decrease in capacitance (5%) after biasing at 3 V for 1,000 hours.

Table 4 highlights the EDLC performance advantage of the AC-CNT cell using this binary electrolyte at 3 V operation. Twenty five percent gains to volumetric capacitance and energy density are realized with the combined systems.

TABLE 4

| Cell performance property | AC-CNT pouch cell | |
|---|---|---|
| | 2.7 V | 3.0 V |
| Rated Capacitance (F) | 1.0 | 1.0 |
| Volumetric Capacitance (F/cm$^3$) | 20 | 25 |
| Energy Density (Wh/L) | 20 | 25 |

Figure 16:
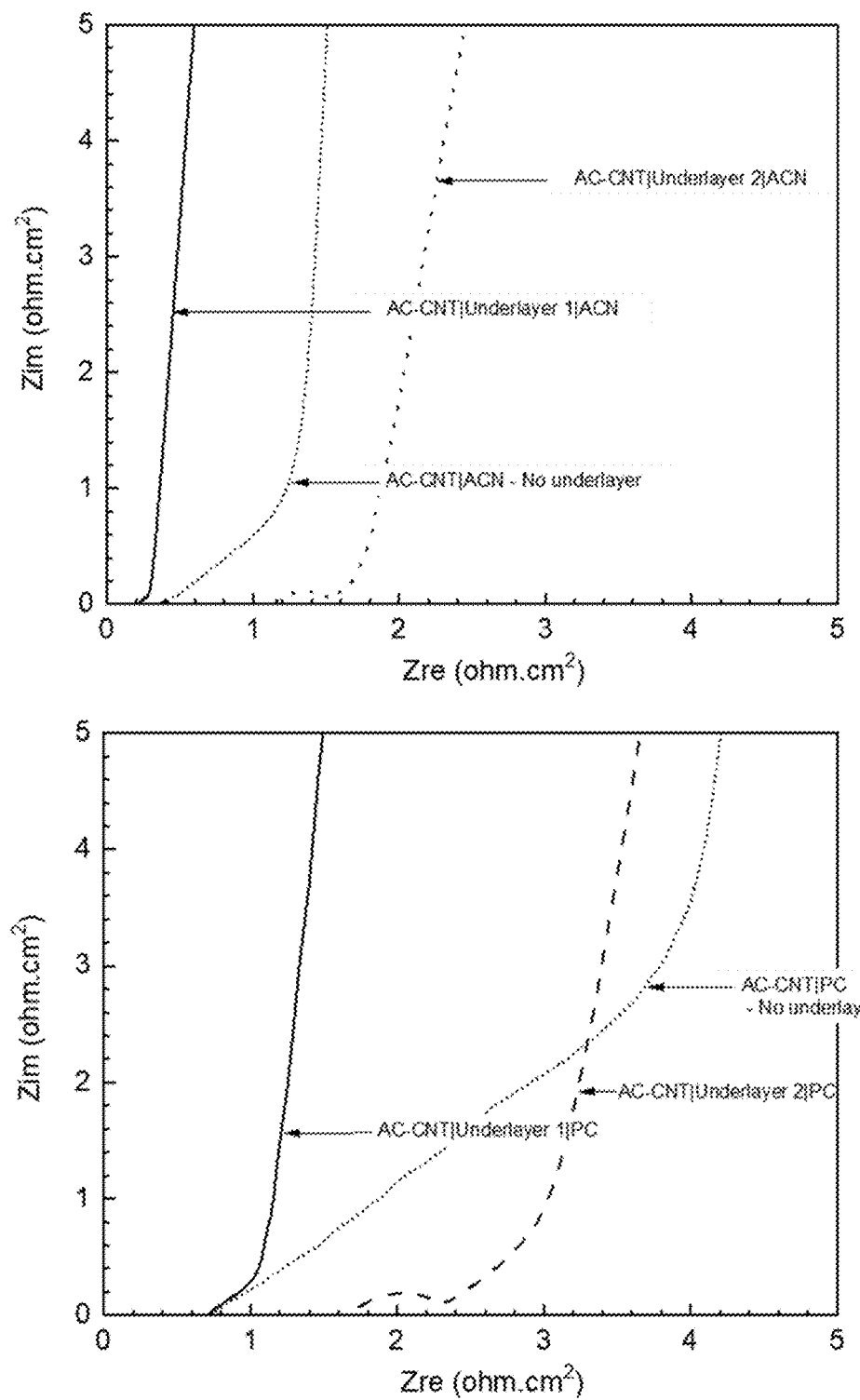
FIG. 16 shows the Nyquist plots of AC-CNT cells with ACN (top) and PC (bottom) electrolyte without an underlayer, and with two types of underlayer, one being a preferred underlayer comprising $sp^2$ carbon.

Example 5—Reduction of EDLC Cell ESR Using Underlayer with High Sp$^2$ Carbon Content Adhesion of the AC-CNT active layer to the underlying current collector foil improved when it was deposited onto a current collector with a conductive carbon primer layer, compared with when it was deposited onto an uncoated current collector foil. Moreover, when electrodes comprising an AC-CNT active layer deposited onto a carbon-primed current collector foil were assembled into EDLC pouch cells and evaluated for performance, the chemical nature of the carbon underlayer had a significant impact on the EDLC cell ESR. FIG. 16 shows the Nyquist impedance profiles for cells containing AC-CNT active layers, with either PC- or ACN-based electrolyte, and fabricated on three types of Al current collector foils. One foil type is uncoated, and the other two are coated with carbon underlayers that differ in carbon (C) hybridization states. Current collector foil with underlayer 1 contains >50% of its C in the sp$^2$ hybridized state, while the foil with underlayer 2 contains >65% C in the sp$^3$ hybridized state. Nyquist profiles for cells with AC-CNT electrodes fabricated on underlayer 2 (more sp$^3$ hybridized C) showed undesirable semi-circles at high frequencies. Such artifacts are noticeably absent in the Nyquist profiles for cells with AC-CNT electrodes fabricated on underlayer 1 (more sp$^2$ hybridized C content). The combination of AC-CNT active layer with the high sp$^2$ carbon underlayer 1 exhibited lowest cell ESR values (<1 Ω·cm$^2$) in both PC and ACN electrolytes.

Table 5 summarizes the EDLC cell ESR values with AC-CNT electrodes fabricated on current collector with either no or different underlayers.

TABLE 5

| Formulation (AC:CNT) | Thickness | Current collector | Cell Electrolyte | ESR (Ω·cm$^2$) |
|---|---|---|---|---|
| 80:20 | 100 μm | No underlayer | PC | 0.760 |
| | | No underlayer | ACN | 0.420 |
| 80:20 | 100 μm | Underlayer 1 | PC | 0.631 |
| | | Underlayer 1 | ACN | 0.227 |
| 80:20 | 100 μm | Underlayer 2 | PC | 1.82 |
| | | Underlayer 2 | ACN | 1.18 |

Example 6—Reduction of EDLC Cell ESR Using AC-CNT Electrodes with Carbon Black (CB)

Table 6 summarizes the EDLC performance comparison between cells with AC-CNT 80:20 wt. % electrodes and AC-CNT 80:15 wt. % electrodes containing 5 wt. % of carbon black. For EDLC cells assembled with PC-based electrolyte, the inclusion of carbon black in the electrode composition reduces the ESR by about 4% compared to cells with AC-CNT electrodes. A larger reduction in cell ESR, about 7%, is observed in ACN-based electrolyte with the AC-CNT-CB electrodes. The reduction in cell ESR with the AC-CNT-CB electrodes, however, is accompanied by a concomitant reduction in volumetric capacitance compared to AC-CNT cells. The higher power density thus can be achieved at the expense of lower energy density by substituting a small fraction of CNT by CB.

TABLE 6

| Electrode Composition | Electrolyte | ESR (Ω·cm$^2$) at 1 kHz | Volumetric Capacitance (F/cm$^3$) |
|---|---|---|---|
| AC:CNT 80:20 wt. % | PC | 0.700 | 20 |
| | ACN | 0.292 | 20 |
| AC:CNT:CB 80:15:5 wt. % | PC | 0.668 | 18 |
| | ACN | 0.269 | 19 |

From the foregoing, it will be appreciated that specific embodiments of the invention have been described herein for purposes of illustration, but that various modifications may be made without deviating from the scope of the invention.

What is claimed is:

1. A supercapacitor cell having at least one electrode comprising a current collector and an active layer, wherein the active layer comprises activated carbon and carbon nanotubes having a purity of at least 95 wt (weight) %, and is free of binder, wherein the content of carbon nanotubes in the active layer is between 15 and 25 wt %.

2. The supercapacitor cell of claim 1, wherein the activated carbon has a BET surface area of at least 1,000 m$^2$/g and the carbon nanotubes have a BET surface area of at least 400 m$^2$/g.

3. The supercapacitor cell of claim 1, wherein the carbon nanotubes are single wall carbon nanotubes.

4. The supercapacitor cell of claim 3, wherein the carbon nanotubes have a length of at least 1 μm.

5. The supercapacitor cell of claim 3, wherein the carbon nanotubes have a Raman G/D integrated peak area ratio of at least 20 measured using a laser having a wavelength of 532 nm.

6. The supercapacitor cell of claim 1, wherein the carbon nanotubes have a purity of at least 97 wt %.

7. The supercapacitor cell of claim 1, wherein the carbon nanotubes have a purity of at least 98 wt %.

8. The supercapacitor cell of claim 1, wherein the electrode does not comprise carbon black.

9. The supercapacitor cell of claim 1, wherein the active layer has a thickness between 30 μm and 200 μm.

10. The supercapacitor cell of claim 1, further comprising a second electrode, wherein the ratio of the volumes of the two electrodes is between 1 and 1.25.

11. The supercapacitor cell of claim 1, further comprising an underlayer located between the current collector and active layer, wherein the underlayer does not comprise carbon in the form of CNT.

12. The supercapacitor cell of claim 1, wherein the current collector comprises aluminum.

13. The supercapacitor cell of claim 1, further comprising a second electrode, a separator positioned between the two electrodes, and an electrically conducting solution comprising an electrolyte, wherein the electrolyte comprises acetonitrile, propionitrile, propylene carbonate, or any combination thereof.

14. The supercapacitor cell of claim 1, further comprising a second electrode, a separator positioned between the two electrodes, and an electrically conducting solution comprising an electrolyte, wherein the electrolyte comprises triethyl-methyl-ammonium-tetrafluoroborate (TEMA-BF4) dissolved in at least 99.9% pure propylene carbonate, tetraethyl-ammonium-tetrafluoroborate (TEA-BF4) dissolved in at least 99.9% pure acetonitrile, or tetraethyl-ammonium-tetrafluoroborate (TEA-BF4) dissolved in at least 99.9% pure propionitrile.

15. A supercapacitor cell having at least one electrode comprising a current collector and an active layer, wherein the active layer comprises activated carbon and carbon nanotubes having a purity of at least 95 wt %, and is free of binder, wherein the electrode further comprises carbon black.

16. The supercapacitor cell of claim 15, wherein the amount of carbon black is greater than 1 wt % but less than 6 wt %.

17. A supercapacitor cell having at least one electrode comprising a current collector and an active layer, wherein the active layer comprises activated carbon and carbon nanotubes having a purity of at least 95 wt %, and is free of binder, wherein the supercapacitor cell further comprises an underlayer located between the current collector and the active layer, wherein the underlayer comprises a carbon layer having at least 40% of its carbon in the $sp^2$ hybridized state, and the underlayer does not comprise carbon in the form of CNT.

18. The supercapacitor cell of claim 17, wherein the underlayer has a thickness between 0.01 and 10 μm.

19. The supercapacitor cell of claim 17, wherein the content of carbon nanotubes in the active layer is between 10 and 30 wt %.

20. The supercapacitor cell of claim 19, wherein the content of carbon nanotubes in the active layer is between 15 and 25 wt %.

21. The supercapacitor cell of claim 17, wherein the activated carbon has a BET surface area of at least 1,000 $m^2/g$ and the carbon nanotubes have a BET surface area of at least 400 $m^2/g$.

22. The supercapacitor cell of claim 17, wherein the carbon nanotubes are single wall carbon nanotubes.

23. The supercapacitor cell of claim 22, wherein the carbon nanotubes have a length of at least 1 μm.

24. The supercapacitor cell of claim 22, wherein the carbon nanotubes have a Raman G/D integrated peak area ratio of at least 20 measured using a laser having a wavelength of 532 nm.

25. The supercapacitor cell of claim 17, wherein the carbon nanotubes have a purity of at least 97 wt %.

26. The supercapacitor cell of claim 17, wherein the carbon nanotubes have a purity of at least 98 wt %.

27. The supercapacitor cell of claim 17, wherein the electrode does not comprise carbon black.

28. The supercapacitor cell of claim 17, wherein the active layer has a thickness between 30 μm and 200 μm.

29. The supercapacitor cell of claim 17, further comprising a second electrode, wherein the ratio of the volumes of the two electrodes is between 1 and 1.25.

30. The supercapacitor cell of claim 17, wherein the current collector comprises aluminum.

31. The supercapacitor cell of claim 17, further comprising a second electrode, a separator positioned between the two electrodes, and an electrically conducting solution comprising an electrolyte, wherein the electrolyte comprises acetonitrile, propionitrile, propylene carbonate, or any combination thereof.

32. The supercapacitor cell of claim 17, further comprising a second electrode, a separator positioned between the two electrodes, and an electrically conducting solution comprising an electrolyte, wherein the electrolyte comprises triethyl-methyl-ammonium-tetrafluoroborate (TEMA-BF4) dissolved in at least 99.9% pure propylene carbonate, tetraethyl-ammonium-tetrafluoroborate (TEA-BF4) dissolved in at least 99.9% pure acetonitrile, or tetraethyl-ammonium-tetrafluoroborate (TEA-BF4) dissolved in at least 99.9% pure propionitrile.

33. A supercapacitor cell having at least one electrode comprising a current collector and an active layer, wherein the active layer comprises activated carbon and carbon nanotubes having a purity of at least 95 wt %, and is free of binder, further comprising a second electrode, a separator positioned between the two electrodes, and an electrically conducting solution comprising an electrolyte, wherein the electrolyte comprises propylene carbonate, dimethyl carbonate, and 5-azoniaspiro-[4,4]-nonane-tetrafluoroborate.

\* \* \* \* \*